United States Patent [19]

Selin

[11] Patent Number: 5,914,796
[45] Date of Patent: Jun. 22, 1999

[54] COMMUNICATION PROTOCOL FOR HALF-DUPLEX TRAFFIC

[75] Inventor: Markku Selin, Tampere, Finland

[73] Assignee: Nokia Mobile Phones Ltd., Salo, Finland

[21] Appl. No.: 08/722,751

[22] Filed: Oct. 1, 1996

[30] Foreign Application Priority Data

Oct. 31, 1995 [FI] Finland ................................ 955200

[51] Int. Cl.$^6$ .................................................. H04B 10/00
[52] U.S. Cl. .......................... 359/136; 359/111; 359/140; 359/172; 359/176
[58] Field of Search .................................. 359/111, 136, 359/140, 172, 176, 154, 159

[56] References Cited

U.S. PATENT DOCUMENTS

| | | | |
|---|---|---|---|
| 4,531,238 | 7/1985 | Rawson et al. | 359/176 |
| 4,531,239 | 7/1985 | Usui | 359/136 |
| 4,584,678 | 4/1986 | Ozeki et al. | 359/136 |
| 5,062,151 | 10/1991 | Shipley | 359/154 |
| 5,247,381 | 9/1993 | Olmstead et al. | 359/118 |
| 5,321,229 | 6/1994 | Holling et al. | 219/448 |
| 5,383,185 | 1/1995 | Armbruster et al. | 370/85.3 |
| 5,563,728 | 10/1996 | Allen et al. | 359/172 |
| 5,633,742 | 5/1997 | Shipley | 359/185 |
| 5,745,272 | 4/1998 | Shipley | 359/137 |

FOREIGN PATENT DOCUMENTS 0 483 548 A1  5/1992  European Pat. Off. .
WO 91/09477  6/1991  WIPO .

*Primary Examiner*—Edward Lefkowitz
*Attorney, Agent, or Firm*—Perman & Green, LLP

[57] ABSTRACT

The invention relates to a communication protocol with the aid of which a half-duplex type data transfer link is arranged between two devices, advantageously a mobile telephone (3) and a data adapter (2) in a computer (1). The link can be in a transfer mode, when data being transferred and control messages (CM) are passed between the devices, or an idle mode, when control messages (CM1, CM2, CM1', CM2') are passed between the devices. In idle mode the timing of the transmission of control messages is free and if two messages (CM1, CM2) collide, i.e. are transmitted simultaneously, they are re-transmitted (CM1', CM2') after time intervals of different duration. In transfer mode mobile telephone (3) regularly transmits a single frame (DATA) decoded by it and immediately before that a possible control message (CM). Data adapter (2) transmits a frame (DATA) every time it receives a frame transmitted by the mobile telephone and immediately after trans-mitting the frame transmits a possible control message (CM). A device can be switched into a sleep mode, in which it receives only for a short time (T2) at regular intervals (T1). A device in sleep mode can be woken up by a wake-up signal.

9 Claims, 4 Drawing Sheets

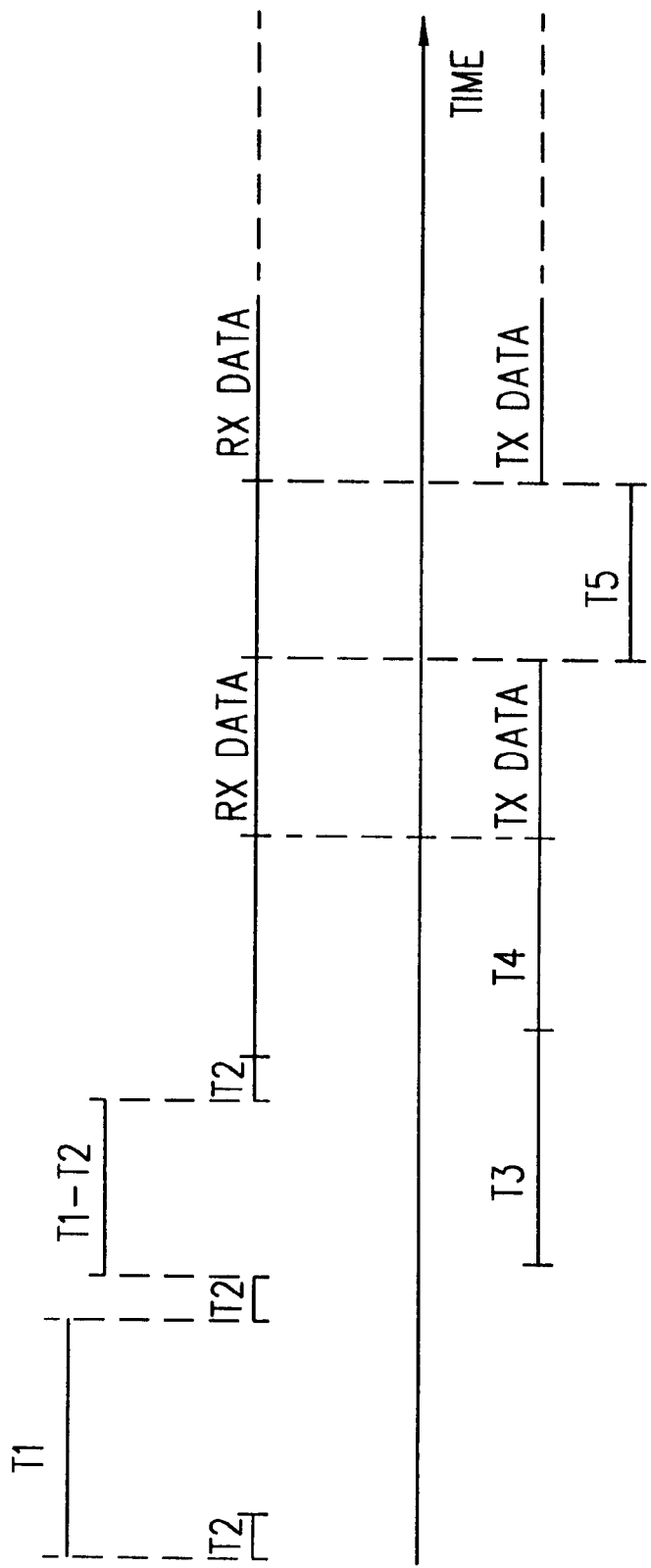

COMMUNICATION PROTOCOL FOR HALF-DUPLEX TRAFFIC

BACKGROUND OF THE INVENTION

The invention relates in general to communication protocols for implementing a connection between two data communication devices and in particular to the management of turns and of collision situations in the so-called half-duplex system based on alternating transmission and reception.

Data transmission systems based on infra-red radiation, i.e. infra-red links, have recently achieved popularity especially in applications where rapid transmission of data is required between two devices located relatively close to each other but where it is not desired to link said devices together by a cable connection. It is an object of the present invention to provide advantageously a protocol suitable for an infra-red link in particular and as an example embodiment the transmission of data between a digital communications adapter for connection to a computer and a mobile telephone for a digital cellular network is described. The invention is not, however, restricted to the example embodiment described but can be applied also in connection with other forms of data transmission and the data transmission call take place between any devices whatsoever that are equipped with suitable means of transmission and reception.

In all transmitter/receiver devices based on radiation and also in many devices using other forms of data communication it is often a problem that if the transmitter and receiver of the device are located in proximity to each other and operate on the same frequency band, part of the transmitted signal reaches the receiver and causes interference. The problem applies particularly to infra-red devices which are used in relatively small enclosed spaces where the infra-red signal, which is propagated with the velocity of light, is reflected from walls and other nearby surfaces and thereby reaches the receiver of the transmitting device practically simultaneous with the transmission. The same problem applies to devices based on fibre optics, in which reflections are caused by joints and discontinuities in the optical fibre. In fibre optics the easiest solution is to employ separate fibres for transmission and reception, but this involves doubled cable costs compared with single fibre equipment.

Another problem, the solution of which by some means is generally an essential part of a communication protocol, is the resolution of so-called collision situations.

Especially in situations in which regular transmission of data is not in progress but in which the devices at intervals send maintenance and/or control messages, for example to verify that the possibility of communication exists, or initialization messages for the commencement of regular data transmission, it may occur that two devices send messages on the common channel at the same time so that the messages become mixed up and neither of them can be understood. Such a situation is called a collision situation. A communication protocol must define how a communication connection is to be normalized after a collision.

From U.S. Pat. No. 4,289,373 (Sugimoto et al.) a solution of the first-mentioned problem is known using a bidirectional optical fibre link in which low-pass and high-pass filters are used to separate radiation in the transmit and receive directions on the basis of wavelength. The same principle can be applied in all data transmission systems based on electromagnetic radiation in which it is possible to separate just a small part of the frequency spectrum for use at one time. Generally the problem is that filters which possess sufficient selectivity to separate two frequency bands relatively close to each other are either bulky or costly or both. Further, the use of optical filters generally means that the transmission and reception frequency bands of a device are fixed, so that the device can only be used to communicate with devices of a certain second type in which the corresponding frequency bands are employed in the opposite order with respect to transmission and reception. The aforesaid patent publication concentrates on the implementation of the equipment and does not describe any protocol which could be used to implement the transmission of data.

From the patent publication WO 85/02271 (Kosman et al.) a bi-directional optical fibre link is known which is suitable for high-speed asynchronous data transmission between several terminal devices. With the equipment described simultaneous bi-directional communication is possible in an optical cable, but with the exception of certain ready signals the publication does not deal with protocol type arrangements. Moreover, the system is probably subject to the aforesaid reflection problems since it comprises a transmitter device and a receiver device located one after the other at one end of the same optical cable. In the publication no arrangements are described for avoiding problems caused by reflections. U.S. Pat. No. 4,399,563 (Greenberg) discloses a fibre optics link for generally known so-called half-duplex communication between two devices. By the half-duplex principle is meant an arrangement in which bi-directional communication between two transmitter/receiver devices is possible, but in which only one transmitter device and the corresponding receiver device at the other end are active at any one time. The receiver located in conjunction with the active transmitting device and the transmitter at the receiving end are switched off or their connection with the data transmission channel is otherwise broken so that they do not cause interference. An essential part of the protocol which governs the link is a procedure for sharing transmission and reception turns.

In the system described in U.S. Pat. No. 4,399,563 the division of turns is implemented by one participant in the link being a so-called master station and the other being a so-called slave station. The master station sends signals at regular intervals with the slave station being then switched to receive. The length of the signal block transmitted at one time is known in advance to both stations and after sending the signal block in question the master station disables its transmitter and enables its receiver. Almost simultaneously (later only by the duration of the physical delay of the transmission channel) the slave station finds it has received a signal block corresponding to the agreed length, whereon it disables its receiver and enables its transmitter to send a reply signal of the same length. The reply process must occur so rapidly that the master station has time to receive the reply of the slave station before the next occurrence of its own regularly recurring transmission turn.

Among the disadvantages of the system described are that the master and slave stations must operate synchronously, which requires synchronization of the clocks governing their operation. Further, the publication does not describe what actions are required for the initialization of communication. Because the link in question is a fixed fibre optics link, it has apparently been supposed in the publication that the master and slave designations are permanent and that only the master station can take action to commence communication.

SUMMARY OF THE INVENTION

An object of the present invention is to propose a communication protocol by the aid of which a high-speed data transmission link can be established between two devices partly avoiding and partly diminishing the disadvantages of prior-known solutions. An additional object of the invention is to propose a protocol by the aid of which the devices participating in the link can act independently to initiate transmission of data. It is further an object of the invention to propose a protocol under which control signals can be appended easily and efficiently to data being transmitted in accordance with the protocol. An object of the invention is also to propose a protocol by the aid of which at least one of the devices participating in the link can be switched into a sleep mode when there is no active transmission of data between the devices. A general object of the invention is that the manufacturing costs of apparatus suitable for the protocol proposed therein are low and that said apparatus is well-suited to mass production.

The objects of the invention are attained by a protocol, according to which:

when there is no active transmission of data between the devices they can freely send control and initialization messages, possible collision situations being resolved by re-transmitting the garbled messages after the lapse of different times for the different devices;

in communication based on regular transmission of blocks of data of a certain size a first device adds control data to its transmission just before the regularly recurring transmission and a second device adds control data to its transmission immediately after the regularly recurring transmission, and a device participating in the communication link can be switched into a sleep mode in which it monitors the communication channel at regularly repeated intervals for a brief period of time, during which it can be woken up or switched to active mode by a certain wake-up message.

The method of the invention for the arrangement of an infra-red communication link between a first device and a second device, which said first device comprises a first infra-red transmission means and a first infra-red reception means and which said second device comprises a second infra-red transmission means and a second infra-red reception means, is characterized in that after a collision, in which collision said first and second transmission means transmit simultaneously, said first device after the elapse of a pre-determined first time interval re-transmits its message which was involved in said collision and said second device after the elapse of a pre-determined second time interval re-transmits its message which was involved in said collision, and said first and second time intervals are of different lengths.

The invention relates also to apparatus for implementation of the method described above. The apparatus according to the invention, comprising a first transmission means and a first reception means and a second transmission means and a second reception means, is characterized in that it comprises in said first apparatus a first delay means for re-transmitting a garbled message after the elapse of a certain first time interval from the transmission of that message, and in said second apparatus a second delay means for re-transmitting a garbled message after the elapse of a certain second time interval from the transmission of that message, and that said first and second delay means are so arranged that said first time interval and said second time interval are of different lengths.

In the protocol of the invention two modes are distinguished which differ from each other in respect of the activity of communication. When neither of the devices participating in the communication link has data to be transmitted, the communication link is said to be in idle mode. The link exists in principle and as a sign of this from time to time the devices send control messages which contain information required for maintenance of the link. Control messages can be exchanged continuously or one or both devices can be switched into a so-called sleep mode, in which most of the activities of the device are switched off in order to save electrical power. A device in sleep mode is switched back into active mode if it gets data to be transmitted to the other device or if the other device gives notice that it wants to send data by transmitting a so-called wake-up sequence.

Because one function of the control messages is to ensure bilaterally that the devices participating in the link can still be reached by each other, control messages must be acknowledged i.e. the device receiving a control message responds by sending a certain acknowledgement sequence to the device which transmitted the message. In idle mode, when the devices send control messages to each other, their activities are not in any way timed with respect to each other. It may then occur that both devices send a control message simultaneously, in which case a collision will occur i.e. the contents of the messages will be mixed up randomly and will not be clear to either device. In the arrangement of the invention this is not a problem, since both devices will re-transmit the unacknowledged control message. Re-transmission will occur after different time intervals for the different devices, so that the next control messages will no longer collide with each other.

When one or both devices have data for transfer, the link is switched to transfer mode. While in transfer mode the devices must exchange control messages. These messages contain information, such as measurement results reporting the quality of the link, which regulates the activities of the devices. In addition the data itself which is to be transferred must be sent from one device to the other. In the protocol of the invention, which is based on the half-duplex principle, a first device regularly transmits data frames, the detailed content of which is described further on. A second device receives the data frames in question and, if it has data to be transferred in the opposite direction, transmits one data frame of its own after each frame it receives and before the next, regularly recurring transmission from said first device. Control messages are incorporated in this mode of transfer by allowing said first device to send one control message immediately before each of its own data frames and said second device to send one control message immediately after each of its own data frames.

DESCRIPTION OF THE DRAWING

In the following the invention is described in greater detail with reference to the preferred embodiments given as examples and to the accompanying figures, in which:

FIG. 5 represents the timing factors associated with sleep mode in the protocol of the invention.

In the figures the same reference numbers are used for components which correspond to each other.

DETAILED DESCRIPTION OF THE INVENTION

Figure 1A:
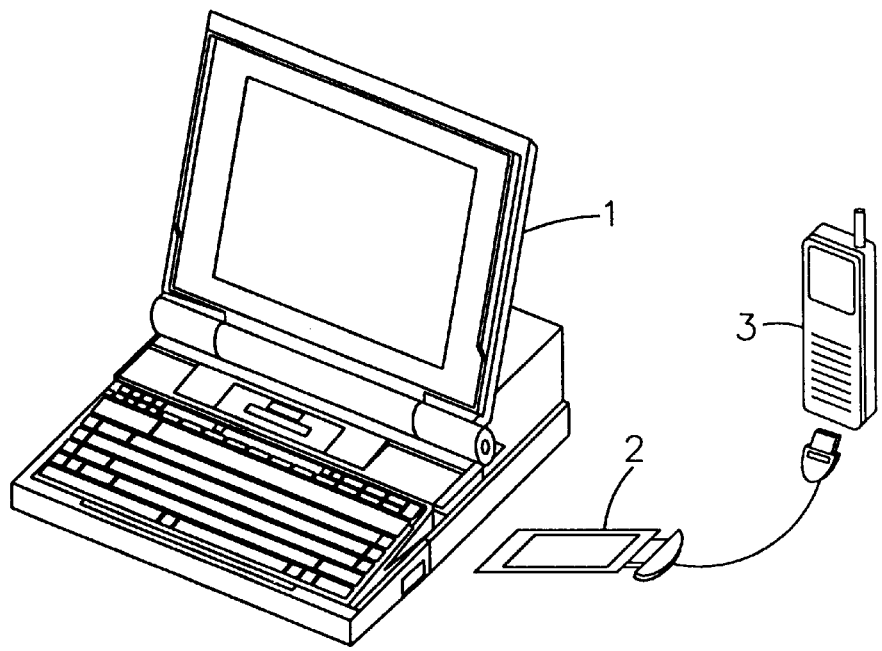
FIG. 1a represents a data transmission link embodying a protocol according to the invention.
Figure 1B:
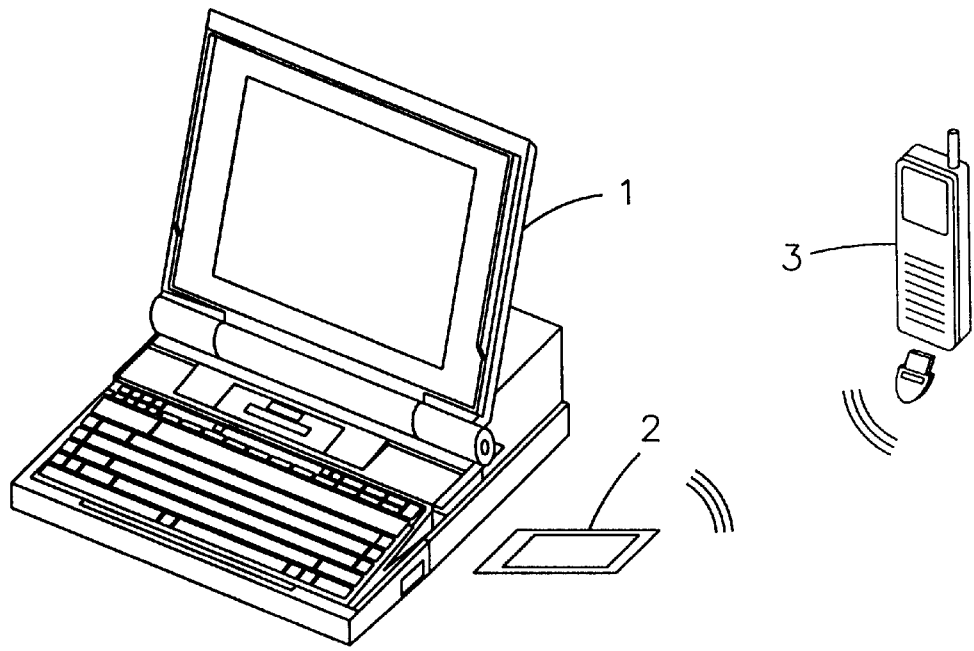
FIG. 1b represents an alternative to the data transmission link of FIG. 1a, FIG. 2 represents in greater detail the components of the communication link of the invention.

As an example embodiment FIGS. 1a and 1b represent a short-range communication link between a digital data adapter 2 connected to a portable computer 1 and a digital cellular-network mobile telephone 3. The computer 1, data adapter 2 and mobile telephone 3 shown are, in themselves, representative of prior-known art and the connection for the transfer of data between data adapter 2 and mobile telephone 3 can be, for example, by means of a cable (FIG. 1a) or by means of an infra-red link (FIG. 1b). The arrangement shown is intended for the transfer of data in digital form between computer 1 and, via a mobile telephone network, some other terminal device. In order to illustrate the nature of the data to be transferred and the control messages required for maintenance of the link, an activity known per se is described in the following with reference to FIG. 2, in which an application programme 4, which in the example is a fax programme, running in computer 1 sends data by means of data adapter 2 and mobile telephone 3.

Figure 2:
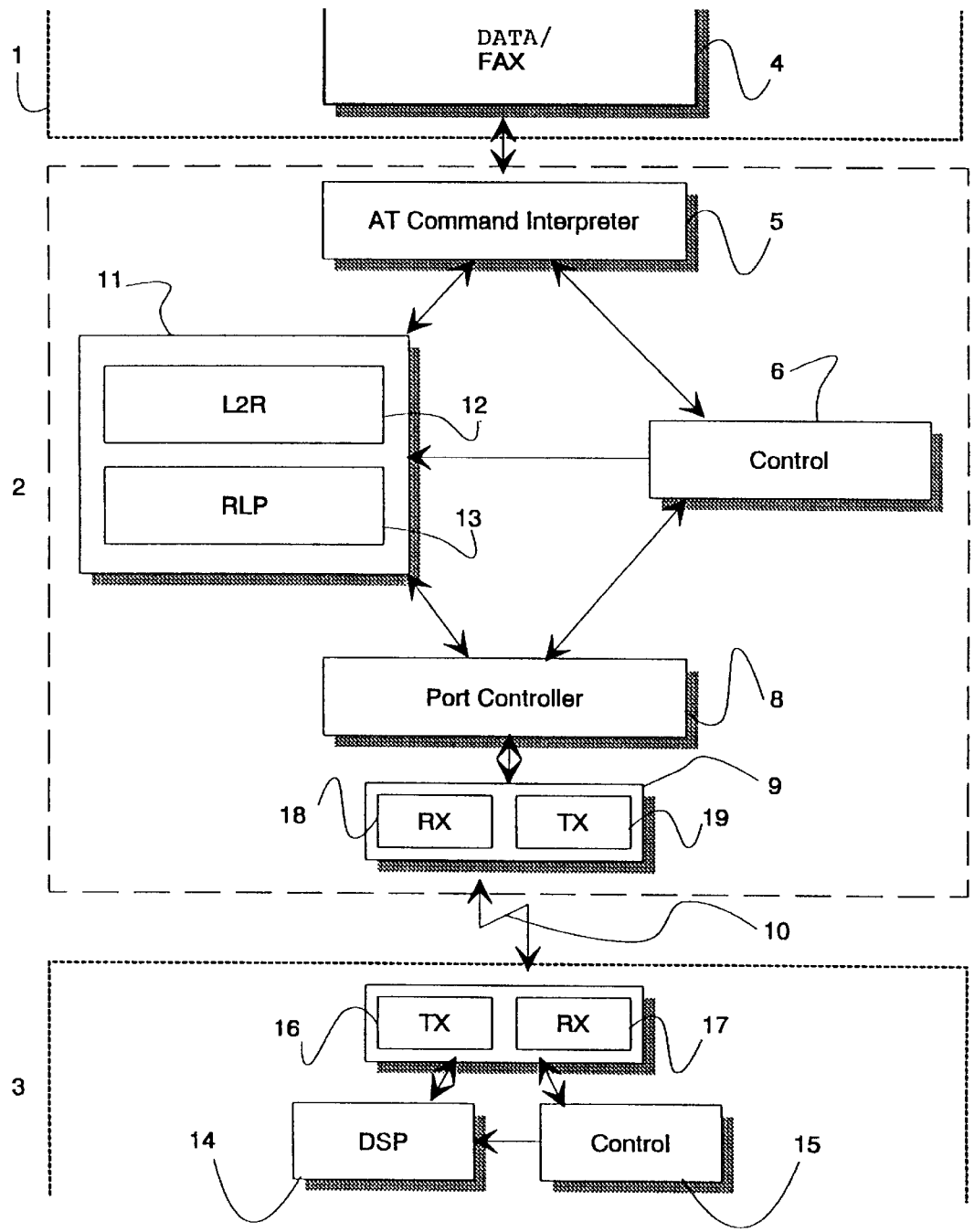

All data adapter designs include an AT command interpreter 5, which receives a character string from application programme 4 and which has the function of deciding whether said character string is a command or a data word to be transferred. In the situation of FIG. 2 to be examined, in which the user wishes to start transfer of data from terminal device 1 to a mobile telephone network, data adapter 2 typically first receives from the application programme the command "ATD123456", in which AT indicates that it is a command, D is an abbreviation for the word "Dial" and 123456 represents here the telephone number of the intended recipient. In response to this command data adapter 2 sends mobile telephone 3 a control message, which includes an instruction to dial the telephone number 123456, by means of AT command interpreter 5 directing said command to control module 6 of data adapter 2, from which the instruction is passed via at least port controller 8, physical port 9 and data transfer channel 10 to mobile telephone 3. The form of the instruction depends on the definitions made by the manufacturer of the mobile telephone and it is some character string, the detailed structure of which is not important in regard to the data adapter or the protocol.

When data adapter 2 has sent the dial instruction to mobile telephone 3, it awaits for notification by a control message from the telephone that the telephone connection has been made. When the successful telephone connection has been made data adapter 2 passes the CONNECT-response from the telephone to application programme 4. After this application programme 4 begins to transfer the data to be transmitted to the data adapter, which at the start of data transfer switches from command mode to data transfer mode.

In data adapter 2 the data for transmission coming from the application programme is directed to data protocol module 11, the structure and function of which depend on which mobile telephone system the data adapter is intended to be used in. A data adapter intended for the GSM system is considered here as an example. In this adapter data protocol module 11 comprises two sub-modules known as the Layer 2 Relay Function (L2R) and the Radio Link Protocol (RLP). The first of these, the L2R module 12, arranges the data to be transmitted in conformity with the GSM Standard GSM 07.02 into Protocol Data Units (PDUs) composed of state octets. These PDUs are sent one at a time to the RLP module 13, where the data is formed into RLP frames conforming to GSM Standard 04.22. Each RLP frame comprises a 16-byte header, a 200-byte information section and a 24-byte Frame Check Sequence (FCS). The finished RLP frames are sent to mobile telephone 3 in which a Digital Signal Processor (DSP) 14 performs channel coding and interleaving for transmission in conformity with the GSM system.

When application programme 4 has transferred all the data for transmission to data adapter 2 and the call can be ended, it informs the data adapter of this by sending a so-called escape sequence, i.e. a character string which is understood by the data adapter as an instruction to switch from data transfer mode back to command node. After this the application programme gives the data adapter the command "ATH", where AT shows that it is a command and H is an abbreviation for "hang-up". Control module 6 of the data adapter passes on the command as a control message to mobile telephone 3 in the same way as described above in connection with the dial command, and telephone 3 ends the connection.

In the following the synchronization of half-duplex functions in the protocol of the invention is explained. The transfer of data between mobile telephone 3 and the base station of the cellular radio system (not shown in the figure) is timed in a manner which depends on the implementation of the cellular radio system. The GSM system used as an example employs Time-Division Multiple Access (TDMA), in which for each 200 MHz wide frequency band eight cyclically-repeating time intervals of 0.577 ms duration are defined, each of which is employed for the link between a different mobile telephone and the base station. For example, on the frequency which is defined as the reception frequency for the mobile telephone (the so-called downlink frequency), mobile telephone 3 receives during one time interval a certain data burst from the base station. In order to improve interference tolerance the RLP frames described above are interleaved in successive data bursts, so that the information contained in a particular RLP frame is divided between several bursts. On receiving a particular data burst the mobile telephone unscrambles the interleaving, so that by combining information extracted from said burst with information extracted from earlier bursts it obtains as a result a certain RLP frame which can be sent to data adapter 2.

In the communication protocol of the invention the external timing formed by the TDMA system is made use in the implementation of the link between data adapter 2 and mobile telephone 3, in that when mobile telephone 3 has received a certain burst and has reconstructed an RLP frame contained in that and earlier bursts, its sends the RLP frame in question to data adapter 2. On the basis of its direction of transfer this frame is called a downlink frame. After this, if data adapter 2 has some other RLP frame ready for transfer to mobile telephone 3, it sends this so-called uplink frame before the mobile telephone has had time to receive the next burst from the base station. If control unit 15 of the mobile telephone has some control message to be sent to data adapter 2, it is sent immediately before sending the downlink frame. Similarly, if control module 6 of data adapter 2 has some control message to be sent to mobile telephone 3, said control message is sent immediately after the uplink frame. This arrangement is advantageous because the exchange of downlink frames and uplink frames between mobile telephone 3 and data adapter 2 always takes place with constant timing independent of whether a control message is to be sent or not, which facilitates the arrangement of signal processing in both devices.

Figure 3:
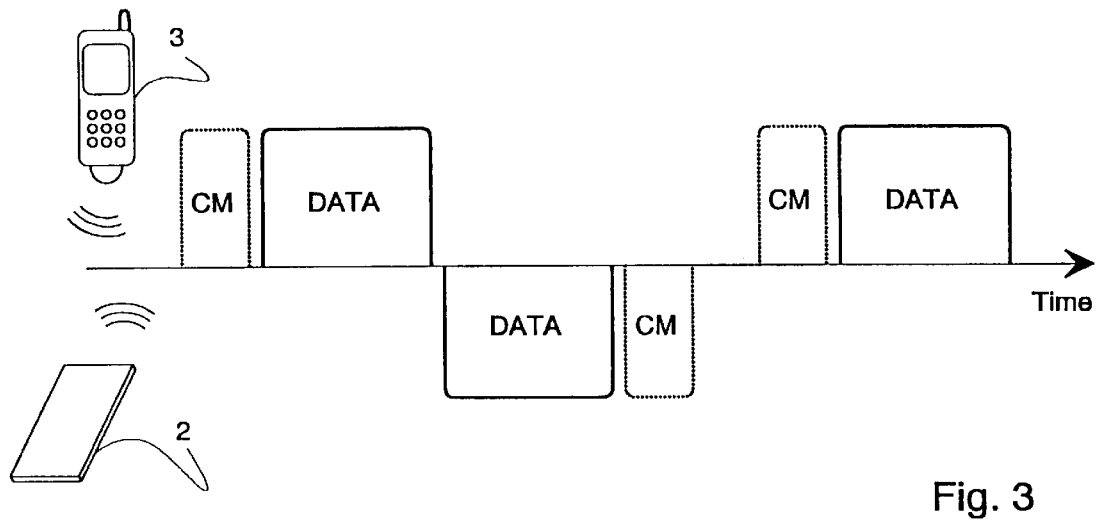
FIG. 3 represents the timing of transmission and reception in the protocol of the invention when the link is in transfer mode.

In accordance with the half-duplex principle, the infra-red transmitter 16 in mobile telephone 3 is active only while it is transmitting a control message and/or RLP frame. After this transmitter 16 is switched off and receiver 17 is activated. Similarly, the data adapter's infra-red receiver 18 is on until control module 6 establishes that a control message and/or RLP frame has been received, whereupon receiver 18 is switched off and the data adapter's transmitter 19 is activated for the time which is required for transmission of an RLP frame and/or control message. After this transmitter 19 and the mobile telephone's receiver 17 are switched off and the mobile telephone's transmitter 16 and the data adapter's receiver 18 are switched on and the operating cycle starts from the beginning. The timing is illustrated in FIG. 3, in which the activities of the pairs of mobile telephone 3 in the active mode of the data transmission link are shown above the time axis and correspondingly the activities of the parts of data adapter 2 are shown below the axis. The control messages CM are shown by broken lines because they are not necessarily transmitted.

The control messages contain information which is essential for the maintenance of the link, so that in the protocol of the invention they are acknowledged in the previously described manner as a sign that they have been successfully received. A control message which is not acknowledged is re-transmitted until it is successfully received. In this connection "successfully received" means that the check sum included in the control message corresponds to the bit content of the message. RLP frames are not acknowledged in data transfers between mobile telephone 3 and data adapter 2, because firstly an error of the size of a single RLP frame occurring in graphical data contained in a fax, for example, is of little consequence and secondly error correction can if required be arranged in other ways. If use of error correction is specified at the time the data transfer link is being established between the sender's and recipient's data adapters then RLP module 13 of the receiving data adapter 2 will check using the check sum contained in the RLP frame whether the frame has been received without error. Report of an incorrectly-received RLP frame is sent along the data transfer link in the opposite direction right up to the sender's data adapter which will then re-transmit the frame in question.

Figure 4:
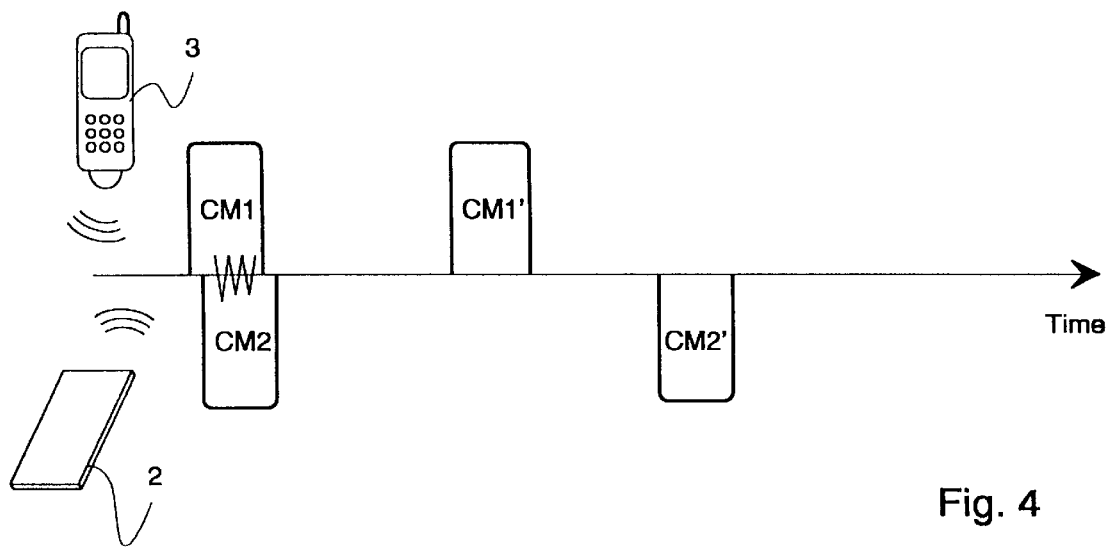
FIG. 4 represents the timing of control messages and the handling of collision situations in the protocol of the invention.

Next the timing of control messages in the protocol of the invention while the transmission link is in idle mode is explained with reference to FIG. 4. Idle mode means that no transfer of actual data between data adapter 2 and mobile telephone 3 is in progress. Then the sending of control messages is not timed in any particular way, but acknowledgement that they have been successfully received is still required. In the collision situation of FIG. 4, in which both devices have sent control messages CM1, CM2 simultaneously, the messages have not been received and must be sent again. The time interval after which re-transmission is attempted is of different length in data adapter 2 and mobile telephone 3, so that the repeated messages CM1' and CM2' do not collide. With regard to the invention it is not important for how long each device waits before attempting re-transmission, provided that the times are of different duration. The duration of the waiting time is determined by the delay means, which in practice are comprised in control units 6 and 15. Various counters, which are used to implement a pre-determined delay as a programmed process, are known per se to those skilled in the art.

Those components of both mobile telephone 3 and of data adapter 2 that are involved in the transfer of data between the devices in accordance with the protocol of the invention can, in order to save electrical power, be switched to a so-called sleep mode if the link is in idle mode and there is no need to send control messages. In sleep mode the components are switched to an inactive state, but the receiver is switched on from time to time so that the other device has an opportunity to "wake up" the device that is in sleep mode. In the following the timing factors associated with sleep mode are explained with reference to FIG. 5.

In the communication protocol a certain time is defined, after which the devices can be switched to sleep mode if no traffic has been detected. While in sleep mode the receiver of each device is switched on for a period of time T2 when a check is made whether the other device is transmitting. The monitoring periods T2 are repeated at intervals determined by time T1. If the data adapter's control module 6 or correspondingly the mobile telephone's control unit 15 gets data for transmission it first activates its own transmitter device 16, 19. A transmitting device which wants to wake up a receiving device in sleep mode, first transmits a certain wake-up signal, which in the preferred embodiment consists of so-called synchronization pulses for a period of time T3 followed by a pause of duration T4. In order that the wake-up signal cannot fall between two successive monitoring periods T2 of the receiving device, the period T3 is preferably longer than the period (T1–T2) between the monitoring periods. The purpose of the pause T4 is to allow the device which is being woken up to synchronize its activities at the character and message level correctly before the start of the actual transmission. It is generally a feature of communication protocols that if two received signal fragments are separated by at least a certain separation time T5 then said signal fragments are interpreted as belonging to different messages. It is then possible for a transmission situation that has become confused to be resolved by holding a pause in the transmission with a duration not less than the separation time T5. In a preferred embodiment of the invention, time T5 is equal to the frame interval in the corresponding TDMA system.

A break in the link is detected when the other device has still failed to acknowledge a control message sent to it after the message has been repeated a certain number of times. If the link is broken while in transfer mode the break is noticed at mobile telephone 3 by uplink frames no longer arriving, and at data adapter 2 by data protocol module 11 reporting a protocol error to control module 6.

By following the communication protocol of the invention it is possible to achieve very simple and reliable data transfer between devices operating on the half-duplex principle. The number of definitions required is small and the right to initiate a connection is not limited to any particular type of device. According to the protocol transmissions can comprise both the actual data to be transferred and also control messages. The timing governing the exchange of frames containing the data being transferred is the same regardless of whether control messages are being sent or not. The protocol covers the switching of devices to a sleep mode and their awakening. All the functions required by the protocol can in the preferred embodiment be implemented by programme processes executed in the control units of the devices and are thus advantageous from the production viewpoint and readily modified.

What is claimed is:

1. A method for arranging an infra-red data transfer link between a first device and a second device, said first device comprising a first infra-red transmitter means and a first infra-red receiver means and said second device comprising a second infra-red transmitter means and a second infra-red receiver means, wherein, after a collision, in which collision said first and second transmitter means transmit simultaneously, said first device transmits the message (CM1) involved in said collision again (CM1') after elapse of a predetermined first period of time and said second device transmits the message (CM2) involved in said collision again (CM2') after elapse of a predetermined second period of time, and said first and second periods of time are of different duration; and the method further comprises placing at least one of said first and said second devices in a sleep mode during an idle mode of said data transfer link, and waking the receiver means of said one of said first and said second devices during successive intervals of time for receipt of a possible wake signal from the other of said first and said second devices, thereby to wake said one of said first and said second of said devices to receive a transfer of data from said other of said first and said second devices.

2. A method according to claim 1, wherein said data transfer link comprises a transfer mode, in which data to be transferred and control messages (CM) are passed between said first and second devices and an idle mode in which control messages (CM1, CM2, CM1', CM2') are passed between said first and second devices.

3. A method according to claim 2, wherein, in said idle mode, the time at which control messages (CM1, CM2) are sent can be chosen freely by said first and second devices.

4. A method according to claim 2, wherein, in said transfer mode, said first device transmits at one time a certain amount of data being transferred at regular intervals of a predetermined first duration known to said second device, and said second device transmits a certain amount of data being transferred when it has received the data transmitted at one time by said first device and before the next transmission from said device.

5. A method according to claim 2, wherein, in said transfer modes said first device transmits a control message (CM) immediately before it transmits data being transferred.

6. A method according to claim 2, wherein in said transfer mode, said second device transmits a control message (CM) immediately after it transmits data being transferred.

7. A method according to claim 2, wherein, when said data transfer link has been in idle mode for a certain period of time, at least one of said first and second devices is switched to said sleep mode in which a significant part of its activities is switched off and in which its receiver means is switched on regularly for a pre-determined second time interval (T1) in order to determine whether some second device is sending messages to the device which is in sleep mode.

8. A method according to claim 7, wherein, upon returning a device in sleep mode to active mode, said wake signal is provided with a duration greater than that of said second time interval (T1).

9. Equipment for transfer of data by means of infra-red radiation between a first device and a second device, said first device comprising a first infra-red transmitter means and a first infra-red receiver means and said second device comprising a second infra-red transmitter means and a second infra-red receiver means;

wherein the equipment further comprises in said first device a first delay means for re-transmitting a message subject to interference after elapse of a certain first period of time from its transmission and, in said second device, further comprises second delay means for re-transmitting a message subject to interference after elapse of a certain second period of time from its transmission, and said first and second delay means are so arranged that said first period of time is of a different duration from said second period of time; and wherein the equipment further comprises sleep means for placing at least one of said first and said second devices in a sleep mode during an idle mode of a data transfer link, said sleep means serving for waking the receiver means of said one of said first and said second devices during successive intervals of time for receipt of a possible wake signal from the other of said first and said second devices, thereby to wake said one of said first and said second of said devices to receive a transfer of data from said other of said first and said second devices.

* * * * *